United States Patent [19]

Stuart et al.

[11] Patent Number: 4,614,597
[45] Date of Patent: * Sep. 30, 1986

[54] RECOVERY OF OIL AND SULFONATE FROM FILTER CAKE

[75] Inventors: Frank A. Stuart, San Rafael; William H. Tyson, Jr., Moraga, both of Calif.

[73] Assignee: Claypro U.S.A., San Francisco, Calif.

[*] Notice: The portion of the term of this patent subsequent to Oct. 1, 2002 has been disclaimed.

[21] Appl. No.: 682,670

[22] Filed: Dec. 17, 1984

Related U.S. Application Data

[63] Continuation-in-part of Ser. No. 526,011, Aug. 24, 1983, Pat. No. 4,544,491.

[51] Int. Cl.$^4$ ............................................. B01D 12/00
[52] U.S. Cl. .................................... 210/772; 208/180; 208/183; 210/774; 210/804; 260/504 A; 260/505 N; 260/505 P
[58] Field of Search ............... 208/13, 179, 180, 181, 208/183; 210/768, 772, 774, 791, 797, 804; 260/504 R, 504 A, 505 N, 505 P

[56] References Cited

U.S. PATENT DOCUMENTS

| | | | |
|---|---|---|---|
| 2,387,488 | 10/1945 | Acken et al. | 210/768 |
| 2,579,946 | 12/1951 | McClain | 210/768 |
| 2,768,120 | 10/1956 | Rieteina | 210/768 |
| 3,213,131 | 10/1965 | Benedict | 260/504 R |
| 3,433,816 | 3/1969 | Muller | 210/772 |
| 3,707,464 | 12/1972 | Burns et al. | 210/705 |
| 3,725,467 | 4/1973 | Chorney | 260/504 A |
| 3,790,474 | 2/1974 | Moffitt | 208/179 |
| 4,158,638 | 6/1979 | Tsai | 208/11 LE |
| 4,225,509 | 9/1980 | Seth | 260/505 N |
| 4,501,670 | 2/1985 | Tyson et al. | 210/770 |
| 4,544,491 | 10/1985 | Tyson, Jr. et al. | 210/772 |

FOREIGN PATENT DOCUMENTS

| | | | |
|---|---|---|---|
| 242272 | 7/1926 | United Kingdom | 208/179 |
| 269148 | 2/1928 | United Kingdom | 208/179 |
| 327721 | 4/1930 | United Kingdom | 208/179 |

*Primary Examiner*—Peter Hruskoci
*Attorney, Agent, or Firm*—Limbach, Limbach & Sutton

[57] ABSTRACT

A process for recovering oil containing dissolved alkaline earth metal sulfonate from siliceous filter cakes containing such oils by mixing the filter cake with sufficient 0.5 to 16N sulfuric acid or phosphoric acid to bring the pH of the mixture to a level in the range about 2 to 7, settling the acid-filter cake mixture to separate an upper oil-sulfonate phase and recovering the upper phase.

5 Claims, No Drawings

RECOVERY OF OIL AND SULFONATE FROM FILTER CAKE

This application is a continuation-in-part of application Ser. No. 526,011, filed Aug. 24, 1983 now U.S. Pat. No. 4,544,491.

TECHNICAL FIELD

Oil soluble alkaline earth metal sulfonates are widely used as lubricating oil additives. These materials are produced by sulfonating a hydrocarbon feed stock having a high content of alkyl aromatic hydrocarbons characterized by a long alkyl side chain bonded to an aromatic radical. The hydrocarbon feed stocks may be either synthetic alkyl aromatic hydrocarbons produced by alkylating benzene with a high molecular weight propylene polymer or they may be refined heavy petroleum distillates characterized by a high content of the alkyl aromatic hydrocarbon molecular types. Suitable petroleum distillates typically have an average molecular weight of about 480. The synthetic feed stocks may be somewhat lower in molecular weight but average molecular weights are above 400. The sulfonic acids produced in the sulfonation reaction are then converted to alkaline earth metal sulfonates.

Conversion of the sulfonic acids to alkaline earth metal sulfonates may be accomplished by direct neutralization with a base acting alkaline earth metal compound such as the hydroxide, oxide or carbonate. This conversion is also made by neutralizing the sulfonic acids with an alkali metal hydroxide and the alkali metal sulfonate formed is converted to the alkaline earth metal sulfonate by metathesis with an alkaline earth metal compound such as the hydroxide, oxide, carbonate or chloride.

These sulfonates may be neutral salts obtained by reacting the sulfonic acids with the quantity of base acting alkaline earth metal compound stochiometrically required to neutralize the acids or they may be overbased. Overbased sulfonates are prepared by contacting the sulfonic acid or an alkali metal salt of the acid with a stochiometric excess of base acting alkaline earth metal compound. The process consists in mixing the sulfonic acid or its alkali metal salt with an excess of basic alkaline earth compound usually with a hydrocarbon diluent and blowing carbon dioxide gas into the mixture. An alcohol is commonly used to promote the production of overbased sulfonate.

The final step in the process for producing either neutral or overbased sulfonates is separation of the desired product from unreacted alkaline earth metal compounds and sludge. This separation is usually made by filtering the product to remove the undesired materials, the filtration step usually includes the addition of a siliceous filter aid to the reaction mixture and/or pre-coating the filter cloth with a filter aid. During the filtration step a filter cake is produced which contains the solids which were present in the reaction product and the filter aid. The filter cakes have a very substantial content of oil and sulfonate. Heretofore, for the most part these filter cakes have been discarded as an unwanted by-product of the sulfonate production process. Disposition of the cakes in this manner involves a loss of potentially valuable oil and neutral or overbased sulfonate. In addition, some of the filter cakes are classified as hazardous waste materials and the cost of disposing of them safely is considerable.

The present invention provides a method for recovering oil and sulfonate from the spent filter cake and, in addition, reduces impurities contained in the filter cake to a level such that the treated filter cake is no longer hazardous, may be readily disposed of and may often serve useful purposes.

BRIEF DESCRIPTION OF THE INVENTION

Pursuant to the invention filter cakes obtained by filtering oils containing dissolved alkaline earth metal sulfonates and suspended solid base acting alkaline earth metal compounds employing a siliceous filter aid are mixed with a quantity of 0.5 to 16N phosphoric acid or sulfuric acid sufficient to bring the pH of the acid-filter cake mixture to a pH level in the range 2 to 7. The acid is added to the filter cake at a sufficiently low rate to avoid excessive foaming due to carbon dioxide release from the filter cake.

The temperature of the filter cake-acid mixture is preferably maintained at a level between about 150° F. and the boiling point of the mixture. The higher temperatures cause more rapid and complete release of the oil-sulfonate material from the filter cake solids.

The rapidity and completeness of the release of oil-sulfonate from the filter cakes, especially cakes containing overbased sulfonates, is considerably increased by adding a hydrocarbon diluent to the filter cake-acid mixture. Toluene, xylenes and petroleum distillates boiling in the range about 200°–325° F. commonly called petroleum thinners or solvents are suitable diluents and are added in amounts that result in considerably reducing the thickness of the filter cake-acid mixture. Usually from about 15 to 100 cc of hydrocarbon diluent to 100 grams of contained filter cake are suitable.

When the acid employed is concentrated, e.g., 6-16N the total liquid content of the filter cake-acid mixture is low and the solids containing phase formed when the mixture is settled is quite thick and oil-sulfonate release is slow. The release rate is greatly increased by adding hot water to the thick phase. Addition of water in amount ranging from about 40 to 100 cc per 100 grams of filter cake contained in the filter cake-acid mixture thins the thick phase and facilitates separation.

DETAILED DESCRIPTION OF THE INVENTION

The following examples provide detailed descriptions of the process as applied to particular filter cake treatments.

EXAMPLE 1

99 grams of a filter cake obtained by filtering a moderately overbased calcium sulfonate in solution in an oil of lubricating viscosity using a diatomaceous earth filter aid is treated. The overbased sulfonate had a Total Base Number of 50 determined by ASTM 2896 procedure. It was dispersed in 50 cc of an aliphatic petroleum distillate boiling in the range about 250°–350° F. and the mixture was heated to about 190° F. 150 cc's of 2N sulfuric acid heated to the same temperature was added in small amounts with constant stirring, while holding the temperature at 160°–190° F. Some evolution of carbon dioxide occurred. During the addition of acid, white calcium sulfate could be seen forming and a dark clear oil broke loose from the mixture. By the time all of the acid had been added, the pH had reached a value of 2 and a good separation had resulted, yielding two phases—an upper phase of clear dark oil and a lower phase consisting of calcium sulfate, filter aid and water—all of which acted as a single phase. The mixture was percolated gently with moderate stirring for about five minutes. No difficulties with emulsification were encountered.

At this point 150 cc's of hot water were added slowly down the side of the beaker with gentle stirring. Following this addition, the mixture was allowed to stand and separated into 100 ml of clear dark oil phase with no cuff or emulsion; about 150 ml of a clear aqueous phase and about 150 cc's of a lower layer of white calcium sulfate and filter aid in the acid solution. The oil phase was separated as product.

EXAMPLE 2

100 grams of the filter cake of Example 1 were dispersed in 50 cc of the hydrocarbon added in Example 1 and heated to 170° F. 39 cc's of 8N sulfuric acid were added incrementally over a period of about 10 minutes with continuous stirring. The mix was allowed to digest for five minutes, separation occured as noted in Example 1. 260 cc's of hot water were then added slowly down the side of the beaker and 110 cc's of clear dark oil rose forming an upper phase. About 110 cc of aqueous layer and 150 cc's of slightly off-white filter aid-calcium sulfate slurry formed below the oil layer. Some cuff was formed between the oil and the aqueous interface. The oil phase was separated.

The acid was added slowly to avoid excessive foaming due to $CO_2$ release from the filter cake. When, as in this example, rather concentrated acid is employed the total volume of the acid-cake-hydrocarbon mixture is relatively small and the solids content per unit volume of the mixture is high and oil release is slow, hot water is introduced into the lower portion of the mixture to thin the slurry and facilitate hydrocarbon-sulfonate separation.

EXAMPLE 3

100 grams of the same filter cake of Example 1 was dispersed in 50 cc of hydrocarbon liquid and 19 cc's of 16N sulfuric acid were slowly added to the mixture. After a five-minute percolation, the mixture was diluted with 280 cc's of boiling water resulting in separation to a lower phase of 190 ml of slurry, about 100 cc's of an intermediate aqueous phase and an upper phase of 120 cc's of oil, the upper 70 cc's of which was clear and dark—the lower 50 cc's being an oil-water emulsion. During the five minute "percolation" the mixture is set on a hot plate and thermal currents in the mixture provide very gentle agitation of the solid components.

EXAMPLE 4

100 grams of the same filter cake of Example 1 was dispersed in 50 cc of the same hydrocarbon and treated with 166 cc's of 1N sulfuric acid, which was added in small increments with constant stirring at a temperature of 180°–200° F. After percolating for five minutes, another 134 cc's of acid was added down the side of the beaker, giving a separation into the 135 cc's of bright clear oil with no cuff, 150 cc's of slightly turbid aqueous phase and 150 cc's of a filter aid-calcium sulfate layer.

EXAMPLE 5

A 1-liter 3-necked flask was fitted with a variable speed stirrer, a reflux condenser, a thermometer and a dropping funnel. The stirrer consisted of two Teflon paddles or blades attached to a glass reinforced Teflon shaft with stainless steel screws. The lower blade was about three inches in diameter and one inch wide at the center, the lower edge shaped to fit the 1-liter flask and tapering up to a point at each end. The upper blade was about four inches in length by ¾-inch in width, mounted on the opposite side of the shaft with its lower edge about ½-inch above the bottom paddle. By rotating these blades to a position parallel with the stirrer shaft, they could be inserted into the center joint of the reaction flask and then pushed down to their normal stirring position where they imparted thorough agitation of the lower half of the flask's contents.

To the flask was charged 200 grams of the filter cake of Example 1 dispersed in 100 cc's of a petroleum aliphatic thinner. The mixture was heated to about 215° F. and 300 cc's of 2N sulfuric acid were added dropwise from the dropping funnel over a period of about 8 minutes. During the initial addition, some foaming occurred and addition was temporarily slowed down and then resumed, maintaining reflux of the water-thinner phase during the reaction (temperature 212° F.).

As the sulfuric acid was added, oil started breaking loose from the cake and could be seen dispersed throughout the cake mass. This mass moved rather slowly to the surface of the mixture, but as addition of acid proceeded its velocity increased and by the time all of the acid was added, the mixture consisted of a fluid, lower phase of an off-white dispersion of filter aid, calcium sulfate and water, which acted as a single homogeneous phase. The upper phase was a dark clear solution of free sulfonic acid and possibly some calcium sulfonate in the thinner. This mixture was allowed to reflux with quite brisk agitation for an additional 5 minutes.

The contents of the flask was then transferred to a 2-liter Erlenmeyer and hot water was added from a separatory funnel attached by a rubber tube to a glass tube reaching to the bottom of the Erlenmeyer. This lass rod was swirled gently and the water was introduced into the bottom of the flask with enough agitation so that trapped oil was liberated from the solids and allowed to rise to the surface but not so much agitation that the oil phase was mixed with the water to produce an emulsion. After addition of 500 cc's of water, the mix was allowed to stand and separated into three phases with a bright clear oil on the top with no significant amount of cuff or emulsion and a slightly off-white mixture of clay and calcium sulfate on the bottom.

The oil was removed, treated with lime to convert the free sulfonic acid back to calcium sulfonate and any entrained sulfuric acid to calcium sulfate and then stripped of thinner to recover the calcium sulfonate. The solids were filtered through a Buchner funnel, washed with 500 cc's of hot water, rendering them suitable for simple disposal.

EXAMPLE 6

Example 1 was repeated with two changes—the temperature was maintained at 150° F. and the final dilution was made with 2N acid instead of water. A good separation resulted, yielding 120 cc's of dark clear oil.

EXAMPLE 7

150 cc's of 2N sulfuric acid was heated to 180° F. and 100 grams of the filter cake of Example 1, heated to 180° F., was added to it over a period of about 5 minutes with stirring. The mixture was percolated for 5 minutes and then diluted with 150 cc's of 2N sulfuric acid poured down the side of the beaker, giving a fair separation. About 50 cc's of clear dark oil broke free but some clumps of filter aid and calcium sulfate were suspended in it. Some oil could be seen dispersed in the solids at the top of the lower slurry phase itself. A solids layer of 130 cc's was light colored. In this example no hydrocarbon liquid was added to the filter cake-acid mixture. While appreciable oil-sulfonate separation occurred, oil-sulfonate recovery was smaller and removal of oil from the solid components of the mixture was less complete than in the examples in which hydrocarbon addition was employed.

EXAMPLE 8

100 grams of the filter cake of Example 1 were dispersed in 50 cc of the hydrocarbon liquid of Example 1 and heated to 190° F. 100 cc's of hot 1.5N sulfuric acid were added over a 20 minute period, following the pH of the aqueous phase throughout. The final pH was 7 as measured by Hydrion paper. The mixture was percolated for 5 minutes and then diluted with 200 cc of hot water. A fair separation resulted, yielding 60 cc's of oil with some tan colored cuff below it and 175 cc's of clean off-white colored calcium sulfate and filter aid.

EXAMPLE 9

Example 8 was repeated employing 130 cc's of 1N sulfuric acid added over 15 minutes. After percolation and dilution with 160 cc's of water, the pH of the aqueous phase was 7 and good results were obtained. 100 cc's of clear dark oil was liberated with only a trace of cuff and 150 cc's of slurry of clean solid in water formed in the bottom of the beaker.

EXAMPLE 10

100 grams of the filter cake of Example 1 was dispersed in 50 cc's of the hydrocarbon of Example 1 at room temperature. 150 cc's of 2N sulfuric acid at room temperature was added over 10 minutes with stirring during which period of time the temperature rose to 92° F. At this point, the mixture contained about 25 cc's of light brown oil floating above a fluid mixture of white filter aid and calcium sulfate with brown oil dispersed in it. The mixture was stirred at 85° F. for about 5 minutes (no heat was applied) and another 150 cc's of 2N sulfuric acid was added. This resulted in a fair separation giving 50 cc's of clear dark oil with considerable cuff associated with it. In this example the temperature of the mixture of filter cake, hydrocarbon and acid was at temperatures 85° to 92° F. during the entire operation. Separation of oil and sulfonate from the filter cake was achieved to a degree providing a desirable and useful result but separation was significantly less complete than the separation in either Example 6 or Example 1 in which the separation temperatures were 150° F. and 190° F. respectively.

EXAMPLE 11

100 grams of the filter cake of Example 1 was dispersed in 50 cc of the hydrocarbon of Example 1 and 600 cc's of 0.5N sulfuric acid at 180° F. was added. The mixture gave a good separation, yielding 120 cc's of clear dark oil above about 400 cc's of a clear aqueous layer and a lower phase of about 200 cc's of white filter aid calcium sulfate/water mixture.

In this example the concentration of the $H_2SO_4$ employed was 0.5N. In order to achieve good separation a larger volume of acid was required, i.e., four times the volume employed in Example 1 where 2N sulfuric acid was used.

In all of Examples 1-11 the filter cake processed was a moderately overbased sulfonate product, e.g., a product having a total base number (ASTM 2896) of 50. Overbased alkaline earth metal sulfonates having Total Base Numbers of 200 and above are manufactured and the by-product filter cakes contain greater quantities of basic material and greater quantities of acid are required to separate the oil and sulfonate from the cake.

When it is desired to treat a filter cake and the total alkalinity is not known, a sample of the filter cake is titrated with sulfuric acid or phosphoric acid of known concentration. As the acid is added the pH of the mixture is continuously measured. The number of equivalents of acid required to bring the filter cake is calculated (acid volume × acid concentration) for pH levels from 7 down to 2. Thereafter the volume of acid of any selected concentration required to bring the pH of the filter cake to a selected pH level in the 2 to 7 range is readily calculated.

EXAMPLE 12

100 grams of filter cake from production of a neutral sulfonate was dispersed in 50 cc of liquid hydrocarbon and 65 cc's of 0.25N sulfuric acid added over a period of five minutes at 190° F. with stirring. At this point the mixture had a pH of 7 and produced a layer of clear dark oil floating above a yellowish dispersion of filter aid and calcium sulfate/water slurry. The oil was decanted.

In this example the filter cake was obtained during filtration of a neutral (not overbased) sulfonate. The quantity of acid required to bring the filter cake-acid mixture was very small, only 0.016 equivalent of acid for 100 grams of filter cake.

EXAMPLE 13

198 grams of a filter cake formed in the production of a highly overbased calcium sulfonate was dispersed in 100 cc's petroleum thinner at 190° F. and 600 cc's of 4N sulfuric acid was added with stirring. The mixture was allowed to percolate for about 5 minutes and gave a good separation, yielding 210 grams of oil and 250 cc's of a slurry of solids in water.

In this example the filter cake was obtained during filtration of a highly overbased calcium sulfonate. The quantity of acid required to achieve separation of oil and sulfonate from the cake was large, i.e., 1.2 equivalents of acid per 100 grams of filter cake. In the above examples in which the sulfonate filtered had a TBN of 50 only 0.3 equivalents of acid per 100 grams of filter cake were required to achieve good separation.

EXAMPLE 14

200 grams of a neutral calcium sulfonate filter cake were heated to 200° F. 86 grams of a petroleum thinner boiling in the range 200°-325° F. were mixed with the filter cake. 250 cc of 1N phosphoric acid were added to the filter cake-thinner mixture during a 20 minute period with agitation of the mixture during the addition. The resulting mixture was settled while at about 200° F. Two phases formed, an upper clear oil phase having a volume of 250 cc and a lower slurry phase consisting of acid and dispersed filter aid and calcium phosphate solids. The oil phase was recovered.

EXAMPLE 15

100 grams of a filter cake formed during filtration of a moderately overbased calcium sulfonate using a diatomaceous earth filter aid were heated to 200° F. and mixed with 36 grams of the petroleum thinner of Example 14. 150 cc of 3N phosphoric acid at 200° F. were slowly added to the filter cake-thinner mixture. The resulting mixture had a pH of 2. The mixture was simmered for 5 minutes and then settled forming three layers, a bottom slurry layer consisting of acid and dispersed filter aid and calcium phosphate solids, and having a volume 120 cc, an upper clear oil layer having a volume of 110 cc and a small emulsion cuff having a volume of 10 cc between the top and bottom layers. The oil layer was recovered.

EXAMPLE 16

Two runs, each using 300 lbs. of dry calcium sulfonate filter cake having a sulfonate-oil content of 54% by weight were performed to evaluate the maximum capacity of the pilot testing unit. Feed rates ranged from 20 lbs/min to 36 lbs/min.

The equipment consisted of a batch mixing tank in which solvent was mixed with filter cake and heated using a steam jacket on the tank. When the batch of 300 lbs of filter cake and 100 lbs of solvent was at 180° F. it was pumped at a controlled rate through a jacketed mixing pipe approximately four feet long and 4" diameter. 10% sulfuric acid was injected into this pipe at a temperature of 180° F. at an appropriate rate to achieve a discharge pH of the mixture of 2. The acid-cake-solvent mixture was agitated in the pipe with three pairs of opposed propellers turning at approximately 250 RPM.

The mixture then passed to a four foot long horizontal trough whose discharge end was fastened to the side of a 100 gal. tank. The slurry leaving the propeller mixer was discharged into the feed end of the trough and flowed gently down the trough into the tank. During passage through the trough the oil which had separated floated to the top of the mixture and collected on top of the slurry in the tank where it was decanted by overflowing. The solids in the water phase were moved down the trough by slowly rotating paddles and further gently agitated in the decanter tank by a slowly moving agitator.

Additional 10% acid solution was added to the trough mixture to dilute the water phase and further release oil from the cake. Acid-cake slurry was pumped from the bottom of the tank using a level controller to regulate flow.

The system was not completely closed to the atmosphere so some vapor losses occurred. At a cake feed rate of approximately 28 lbs/min, and mixture pH of approximately 2, oil residues in the processed cake were reduced to 2-4%.

In the examples above, calcium sulfonates have been employed, the sulfonates of both magnesium and barium sulfonates, both neutral and overbased, respond to the treatment employed in the examples in essentially identical manner, the magnesium sulfonates being somewhat more readily separated probably due to the fact that in the treatment of magnesium sulfonates water soluble magnesium sulfate is formed rather than the insoluble sulfates of calcium and barium which increase the quantity of solid material in their filter cakes.

The foregoing examples show that the treatment to which siliceous filter cakes containing oil and alkaline earth metal sulfonate were subjected made a substantially complete separation of oil and sulfonate from the filter cake solids and that the filter cake solids remaining at the end of the treatment were essentially free of organic material and present no disposal problem.

We claim:

1. A process for treating filter cakes obtained by filtering oils containing an alkaline earth metal sulfonate employing a siliceous filter aid to recover oil and sulfonate from the filter cake which comprises:
   (a) mixing the filter cake with a quantity of 0.5 to 16N acid selected from the group consisting of phosphoric acid and sulfuric acid, sufficient to form a mixture having a pH in the range about 2 to 7 and maintaining the mixture at a temperature above 150° F., and;
   (b) settling the hot mixture to separate an upper oil-sulfonate phase and a lower phase comprising acid and filter aid and;
   (c) recovering the upper phase.

2. The process defined in claim 1 wherein about 15 to 100 cc of a hydrocarbon liquid boiling in the range about 200°-325° F. per 100 grams of filter cake are added to the filter cake-acid mixture.

3. A process for treating filter cakes obtained by filtering oils containing an alkaline earth metal sulfonate employing a siliceous filter aid to recover oil and sulfonate from the filter cake which comprises:
   (a) mixing the filter cake with from about 15 to 100 cubic centimeters of a hydrocarbon boiling in the range about 200° to 350° F. per 100 grams of filter cake;
   (b) slowly adding 0.5 to 16N acid selected from the group consisting of phosphoric acid and sulfuric acid to the mixture formed in (a) while agitating the mixture and continuing the addition of acid until the pH of the total mixture is in the range about 2 to 7;
   (c) settling the mixture to separate an oil-sulfonate upper phase, and a lower phase comprising acid and filter aid, and;
   (d) recovering the upper phase.

4. The process defined in claim 3 wherein the acid added to the filter cake is at a concentration in the range of 6 to 16N and after settling of the filter cake-acid mixture is begun adding from about 40 to 300 cc of hot water per 100 grams of contained filter cake to the mixture.

5. The process defined in claim 3 wherein the concentration of the acid added in (b) is greater than 6N and wherein from about 40 cc to 100 cc of hot water per 100 grams of filter cake are added to the mixture at the end of step (c).

* * * * *